US005266138A

United States Patent [19]

Razavi

[11] Patent Number: 5,266,138

[45] Date of Patent: Nov. 30, 1993

[54] FIBER REINFORCED PRODUCTS AND METHOD FOR PRODUCING SAME

[75] Inventor: Fereidoon Razavi, Richmond Heights, Ohio

[73] Assignee: The Glastic Company, Cleveland, Ohio

[21] Appl. No.: 584,267

[22] Filed: Sep. 18, 1990

Related U.S. Application Data

[60] Continuation-in-part of Ser. No. 244,559, Sep. 12, 1988, abandoned, which is a continuation of Ser. No. 19,006, Apr. 22, 1987, abandoned, which is a division of Ser. No. 747,994, Jun. 24, 1985, Pat. No. 4,713,645.

[51] Int. Cl.[5] .............................................. B32B 5/00

[52] U.S. Cl. .................................. 156/177; 156/176; 156/203; 156/218; 156/305; 337/186; 427/203; 428/247

[58] Field of Search ............... 156/305, 203, 176, 218, 156/177, 307.3; 427/203; 428/247; 337/186

[56] References Cited

U.S. PATENT DOCUMENTS

| | | | |
|---|---|---|---|
| 2,900,700 | 8/1959 | Frickert | 156/177 |
| 2,943,010 | 6/1960 | Stefl et al. | 156/305 |
| 3,446,661 | 5/1969 | Andersen | 427/124 |
| 3,979,709 | 9/1976 | Healey | 337/186 |

*Primary Examiner*—John J. Gallagher

*Attorney, Agent, or Firm*—D. Peter Hochberg; Mark Kusner; Michael Jaffe

[57] ABSTRACT

A fiber reinforced composite composed of a scrim/mat. The scrim/mat includes a layer of fiber scrim to which is bonded a layer of fiber mat. This product can be formed into a tubular member such as a fuse tube. The tube is made by pultruding the scrim/mat.

4 Claims, 2 Drawing Sheets

FIBER REINFORCED PRODUCTS AND METHOD FOR PRODUCING SAME

This is a continuation-in-part of application Ser. No. 07/244,559 filed Sep. 12, 1988, now abandoned, which is a continuation of application Ser. No. 07/019,006 filed Apr. 22, 1987, now abandoned, which is a divisional of application Ser. No. 06/747,994 filed Jun. 24, 1985, U. S. Pat. No. 4,713,645.

BACKGROUND OF THE INVENTION

This invention relates to fiber reinforced composite materials, and in particular to pultruded articles such as fuse tubes.

There are various applications for hollow elongated members having high burst strengths, such as the tubular casings for electric current limiting fuses. Current limiting fuses generally include a fusible element which is severed when the electrical current in an electrical power line being monitored exceeds a predetermined limit, and a filler for quenching the arc created when current servers the fusible element. Since the foregoing arc releases substantial heat to, in turn, generate high gas pressures and thermal shock, a casing or tube must be provided around the fuse to contain the explosive forces released and to prevent arcing to ground when the fuse is blown. Such fuse casing should have high burst strength and a high resistance to heat shock. Furthermore, such casings should be capable of manufacture at high production rates and low cost. Compactness is a desired feature, with the casing having thin walls and light weight, but the casing must still perform its intended functions. The fuse casing must be an electrical insulator and resistant to thermal shock. Fuse casings should have dimensional stability in longitudinal, radial, and peripheral (i.e. circular for tubular shapes) directions.

Virtually all fuse tubes in current use are composed of vulcanized fiber, composite materials and ceramics. The composite materials are reinforced with multiple layers of fiber glass —some are composed of only woven fiber glass fabric, and others are combinations of various types of fiber glass reinforcement. Fiber glass conducts electricity poorly. Fiber glass is particularly suitable for fabricating elongated pieces of uniform cross section by the manufacturing process of pultrusion ("uniform cross section" means that that cross section is constant along the length of the piece; many pultruded products have non-uniform regions at a given cross section). Glass fibers can be arranged to provide high strength. Fiber glass products are often flexible, facilitating the assembly of end caps used in fuse tubes. Fuse tubes composed of glass fibers or rovings wound about the inner components of the fuse are disclosed in U.S. Pat. Nos. 2,929,900 (White 1960) and 3,846,727 (Harmon 1974). U.S. Pat. No. 2,727,961 (Smith 1955) discloses a fuse tube having an inner liner for generating arc extinguishing gases, and an outer tubular member wound about the liner and composed of a woven fiber glass cloth or fabric which has been impregnated with resin to bond the glass fibers together. U.S. Pat. No. 3,911,385 (Blewitt et al. 1975) discloses a fuse casing composed of a glass fiber cloth which is impregnated with a melamine resin and has an expoxy resin coating. U.S. Pat. No. 3,979,709 (Healy 1975) discloses a pultruded composite fuse tube construction having an inner layer of woven glass fabric, an intermediate layer of glass fiber mat having non-woven, randomly oriented fibers, and an outer layer of woven glass fiber fabric. The latter patent further discloses the incorporation of multiple layers of mat and a layer of fiber glass rovings between the mats. In U.S. Pat. No. 3,984,800 (Salzer et al. 1976), another pultruded fuse casing is described which includes an inner layer of glass fiber rovings, an intermediate layer of non-woven glass fiber mat and an outer layer of woven glass fiber fabric. In such composite fuse tube constructions, fiber glass fabric is employed because the axial and circumferential fibers combine to provide high burst strength, the fiber glass mat is employed to provide additional strength at a lower cost than the fabric, and rovings are incorporated to facilitate the pulling of the product through pultrusion dies during the manufacturing process.

U.S. Pat. No. 3,986,157 (Salzer et al 1976) discloses a prismatic fuse casing (the term "tube" as used herein means any hollow, elongated member including those of prismatic configuration; however, U.S. Pat. No. 3,986,157 specifically discloses a prismatic member) having an outer layer of woven glass fiber fabric, an intermediate layer of non-woven glass fiber mat, an inner layer of fabric, and four bundles of glass fibers at the respective corners of the member. U.S. Pat. No. 4,124,836 (Wilks 1978) discloses a composite fuse having layers of non-woven fiber glass mat sandwiched between layers of woven fiber glass cloth, with a layer of rovings interposed between layers of mat according to one embodiment; an inner liner of high purified asbestos known as Quintex II is further included. U.S. Pat. No. 4,161,714 (Jacobs, Jr. 1979) describes another composite resin-impregnated fuse tube, this one having an outer layer of glass cloth, one or more intermediate layers of mat, and an inner layer of cloth.

Despite these proposals, the fuse tubes known in the art do not adequately meet the various criteria discussed above. There remains a need for fuse tubes and other tubular products which have an improved burst strength while being compact, which can be produced accurately, efficiently, and inexpensively with reduced amounts of downtime caused by product breakage and the like, which have improved dimensional stability, and which perform their intended purposes reliably and for long periods of time.

SUMMARY OF THE INVENTION

An object of the invention is to provide a fiber reinforced composite product of improved strength.

It is a further object of the present invention to provide an improved tubular electrical insulating member having high burst strength.

Another object is to provide an improved fuse tube capable of being manufactured at a high production rate.

A further object of the invention is to provide an improved fuse tube which can be produced in a highly efficient manner.

It is also an object to provide an improved fuse tube product having an improved tensile strength.

The provision of a pultruded fuse tube having high dimensional stability is yet another object.

Another object is to provide a fuse tube which can be made with tight dimensional control.

It is an additional object of the invention to provide an improved pultruded fuse tube having decreased production downtime resulting from product failure during the production process.

A still further object of the invention is to provide a pultruded glass fiber fuse tube producible at a lower cost than known fuse tubes.

Yet another object is to provide an improved fiber glass fuse tube which is practical, practicable, and inexpensive to manufacture, and effective and efficient to use. Other objects will be apparent from the discussion to follow and from the appended claims.

The foregoing objects are achieved according to the preferred embodiments of the invention by the provision of a fiber reinforced composite product made of layers of mat and scrim which are bonded together. (As used herein, the term "scrim/mat" shall mean woven scrim which is bonded to non-woven mat.) Scrim/mat can be formed into a fuse tube by pultrusion, with the incorporation of rovings being an optional addition to aid in the pultrusion process and to enhance the strength of the tube. The layers of scrim/mat and roving can be in various orders and a fabric liner can be provided as well.

DETAILED DESCRIPTION OF THE PREFERRED EMBODIMENTS

As discussed above, the employment of layers of various resin-impregnated fiber glass mats in the formation of fuse tubes has proven to be the best construction available. However, the various known fuse tubes made as glass fiber composites all use relatively expensive woven glass fiber fabric for the burst strength it provides. Resort has not previously been made to glass fiber scrim in fuse tubes and the like, either as an addition to glass fiber fabric or instead of the fabric. Glass fiber scrim is similar to woven fabric in that scrim is composed of woven glass fibers. However, scrim is of far less weight than fabric, scrim is thinner than fabric and scrim has far fewer thread counts than fabric. Glass fiber scrim often has thicknesses and thread counts of ¼ to ⅓ that of glass fiber fabric, and a cost which often is less than ten percent (10%) of the cost of the fabric. Scrim is commercially available, yet despite its cost advantage over glass fiber fabric, it has not been used in fuse tubes and the like because of its low burst strength.

In the course of the development of the present invention, various problems were encountered which would apparently suggest that fuse tubes made of glass fiber scrim and glass fiber mat, without woven glass fiber fabric, would not adequately perform their intended purpose. The burst strength was found to lie in the 800 psi to 3200 psi range, which especially at the low end was deemed insufficient. An effort to make the outermost layer or ply of glass fiber mat was found to impede the pultrusion process by hindering the pulling of the materials through the pultrusion die. Mat consistency was not satisfactory. Indeed, prior fuse tubes which incorporate glass fiber mat employ that mat as an interior layer because of pultrusion difficulties and a tendency of the glass fibers to unravel from the mat.

It has been found that an improved fuse tube can be constructed by a composite arrangement of glass fiber scrim and glass fiber mat, with the mat and scrim being mechanically and chemically bound by a binder on the engaged surfaces of the two layers. The bonding of scrim to the mat to produce scrim/mat increased the wet tensile strength of the mat from 10 lbs. to 50 lbs. for the scrim/mat. As a result of the bonding of the scrim to the mat which results in increased wet tensile strength and formability, pultrusion of the scrim/mat was accomplished without difficulty at a lower cost than other fuse tube constructions using fiber glass fabric. Furthermore, the burst strengths were found to be improved over those of other composite tubes having unbound layers of fabric, mat, and roving.

Figure 1:
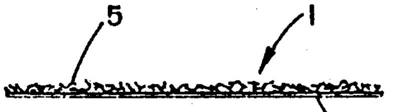
FIGS. 1 and 2 are side and top views, respectively, of bonded layers of fiber glass mat and scrim according to the invention.

Referring to FIG. 1, a laminated structure 1 of glass fiber scrim 3 and glass fiber mat 5 (i.e. scrim/mat) is shown in a flat state as it would appear prior to being changed into a tubular construction as by the process of pultrusion. The scrim is a woven grid-like constructions composed of two groups of parallel lengths of glass fibers, one group extending in the longitudinal or warp direction (or "pull direction" of a pultrusion process) and the other extending in the transverse or fill direction. The mat is a random array of loosely bound, non-woven glass fibers. The two layers are preferably bound together through the intermediary of binder material on one or both of the engaging surfaces of the scrim and mat.

Figure 2:
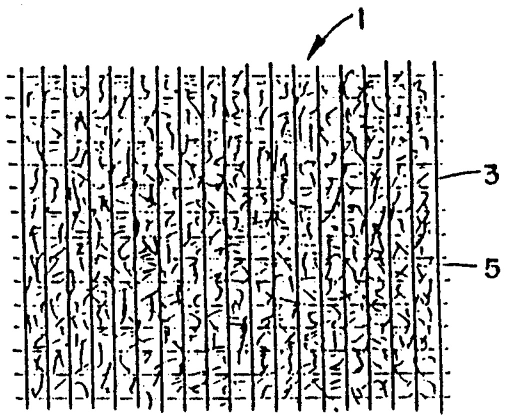
Figure 3:
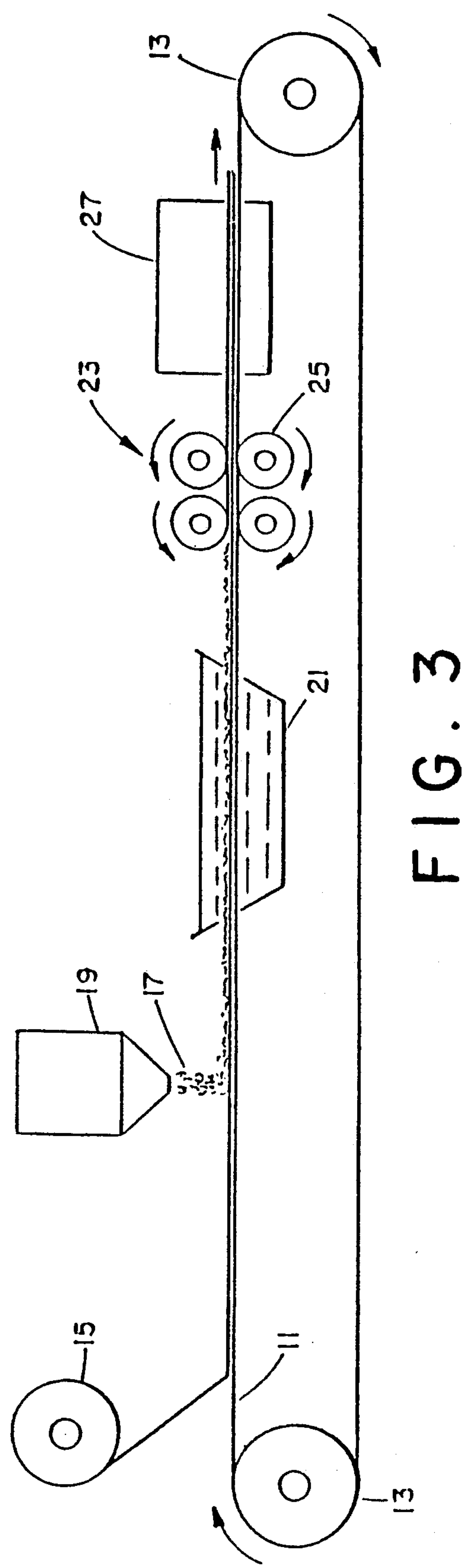
FIG. 3 is a schematic diagram of apparatus for manufacturing the composite shown in FIGS. 1 and 2.

According to the present invention, the schematic diagram of FIG. 3 shows the manner in which the product of FIGS. 1 and 2 is made. A chain link endless belt 11 is driven by a set of drive rollers 13 in the clockwise direction. Woven scrim is fed onto belt 11 from a scrim supply roll 15.

The wrap glass fiber and the fill glass fiber generally define rectangular openings therebetween. Important to the present invention is that the glass fibers in each of the respective groups remain spaced apart and parallel to each other. In this respect, the longitudinal fibers are provided to provide strength in the pull direction. The transverse fibers on the other hand are provided to give lateral support to the longitudinal glass fibers. To do so, it is necessary that the scrim maintain its dimensional stability.

To this end, the glass scrim is initially coated with a polymeric binder material. The binder could be a thermoplastic, an uncured thermoset (dry to the touch), or an uncured thermoset which has been cured following coating. According to the present invention, a cured thermoset, preferably polyester, is used because a cured thermoset resists being dissolved in the styrene monomer typically found in pultrusion resins such as those applied in subsequent processing of the laminate, as described below. Preferably, the amount of binder and completeness of cure is such that the respective longitudinal and transverse fibers are held firmly in place, yet the scrim is still flexible.

As will be appreciated, the flexibility of the scrim will depend on the binder material, the thickness of the binder coating, and the dimensions of the opening between respective glass fibers. With respect to the binder used and the thickness thereof, preferably only enough binder is used to firmly hold the respective glass fibers together. Preferably, the "openness" of the scrim is large enough to permit flexibility, yet small enough to provide sufficient pull strength (i.e. the smaller the "openness", the greater the number of longitudinal and transverse glass fibers). Importantly, according to the present invention, the "openness" of the scrim is also related to the mat which is attached thereto as will be described below.

Chopped, loose glass fibers (or random continuous fibers) 17 are discharged on top of the scrim from a glass fiber reservoir 19 as the scrim is conveyed beneath the discharge port of reservoir 19. It has been found that random continuous strand fiber glass are preferable in pultruding thin-walled products. In this respect, random, continuous strand fiber glass mat generally has an equal number of fibers extending in both directions. By using random continuous strands of fiber glass, a mat is provided which has nearly uniform strength in both the lengthwise and transverse directions. According to the present invention, between ½ ounce and 3 ounces per square foot of glass fiber is randomly laid on the upper surface of the scrim material.

A problem with continuous strand glass mat is that it is basically comprised of a number of overlapping loops which break and become parallel strands when subjected to an axially aligned force exerted on it in opposite direction. It is for this reason that mats of glass fiber alone are not suitable for pultrusion forming. To overcome the poor tensile strength of glass mat, according to the present invention, the random continuous glass strands are "tacked" to each other and to the scrim material. The fiber laden scrim is carried by belt 11 and moved through a resin binder applicator 21 wherein the fiber glass layers are impregnated with the resin. More specifically, according to a preferred embodiment, the glass mat and scrim pass through a liquid bath containing powdered binder resin dispersed therein. As the glass mat and scrim pass through the bath, the random glass fibers of the mat and scrim fibers act as a filter to collect the powdered resin thereon. The powdered resin is preferably a thermosetting resin such as polyester, epoxy, phenolic, or the like. Any resin compatible with the materials used in later pultrusion of the mat is suitable including acrylics.

The resin-impregnated material is next conveyed through a compaction device 23 which wrings or otherwise removes the excess solution carrying the resin binder out of the laminated material and compresses the glass fibers against the glass mat to facilitate later resinous bonding of the scrim to the mat. The material can also be subjected to a vacuum for removing the excess solution. Finally, the material is carried into an oven 27 where any remaining resin-carrying fluid is removed and the binder resin is cured. This enhances the bond between the glass fibers to strengthen the mat and render the mat coherent, and further makes the bond between the mat and the scrim stronger and permanent. The scrim/mat product is next packaged in some convenient form such as in rolls for subsequent use. With respect to the scrim/mat product, the scrim provides the dimensional stability and "wet" tensile strength to the random continuous glass fibers which enable the scrim/mat product to be pultruded. In this respect, a scrim/mat according to the present invention, may pultruded with the continuous glass fiber generally maintaining their orientation and structural integrity.

In the formation of fuse tubes, strips of material of predetermined width are required. In this respect, glass mat alone cannot be cut into the necessary shape in that slitting glass mat destroys the inherent strength of the continuous glass strands and produces strips of short splintered glass fibers which have no tensile strength and which would simply fall apart under tension. With scrim/mat according to the present invention, thin strips of mat can be cut, which strips maintain their shape due to the dimensional stability of the scrim which is bonded thereto. The present invention thus facilitates the formation of thin strips of mat without the need for a glass cloth backing; which cloth is both more expensive than scrim and is less formable than scrim. The tubes are formed by pultrusion, with a strip of the scrim/mat composite being pulled by a set of pullers through a forming guide and an appropriately configured and dimensioned heated mold. Pultrusion is a continuous process, and the fuse tubes are accordingly made by pulling the thermoset tubular workpiece from the heated die and severing it with an automatic saw to the desired length.

As noted above, fiber glass rovings can be incorporated in the fuse tube to facilitate the pultrusion process, and to strengthen the finished product. The rovings are pulled from supply spools through the forming guide and the heated pultrusion die along with the scrim/mat.

Figure 4:
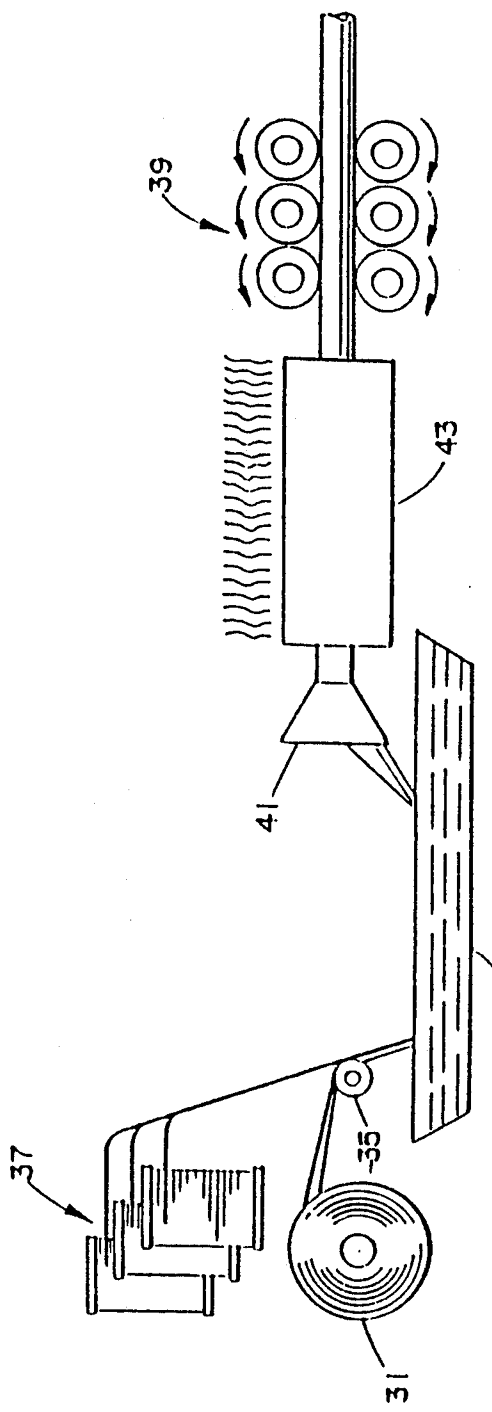
FIG. 4 is a schematic diagram of pultrusion apparatus for manufacturing tubular members from the composite shown in FIGS. 1 and 2.

FIG. 4 shows a pultrusion system in schematic form. Scrim/mat as described above is withdrawn from a supply roll 31 and directed into a resin impregnator 33 shown here as a resin bath over a guide 35. Rovings, when used, are drawn from a set of supply rolls 37 and also directed over guide 31 into impregnator 33. The work in process is pulled through the system by a set of pullers 39. The two materials, i.e., the scrim/mat and the rovings, are impregnated with resin in by impregnator 33. Pullers 39 pull the resin impregnated scrim/mat and roving combination through a forming die 41 where the scrim/mat formed into a tubular shape with the rovings in a generally equally spaced relationship extending longitudinally in the tube against the inner or outer surfaces of the tubular product. The formed product is next pulled through a heated mold 43 where the resin is cured.

The resin in impregnator 33 is provided to bind all of the materials in the pultruded product, as well as to add strength and rigidity. Such resins can include phenolics, melamines, unsaturated polyesters, epoxies, silicones, and the like. To these resins, various fillers, pigments, and other property modifiers can be added.

Fillers include trihydrate of alumina, clay, calcium carbonate, gypsum, and the like. Examples of pigments include black iron oxide, carbon black, titanium dioxide, and the like. Other property modifiers include processing aids, such as fumed silica rheology control agent, flame retardants such as halogenated paraffins, or antimony compounds, and the like.

The mat, scrim, and rovings can be arranged in different ways by controlling the orientation of these components as they are fed to the pultrusion apparatus. The cross sections of various fuse tubes according to the invention are shown in FIGS. 5–8.

Figure 5:
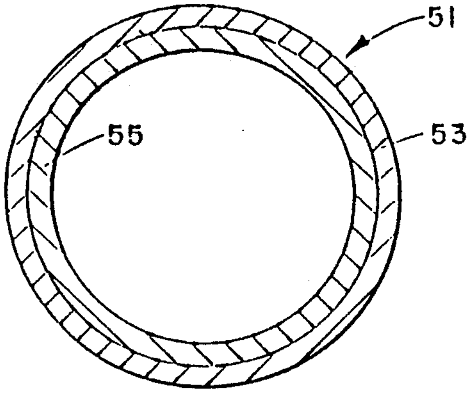
FIGS. 5–8 are schematic cross-sectional views of various arrangements of the layers of fiber glass materials in fuse tubes according to different embodiments of the invention.
Figure 6:
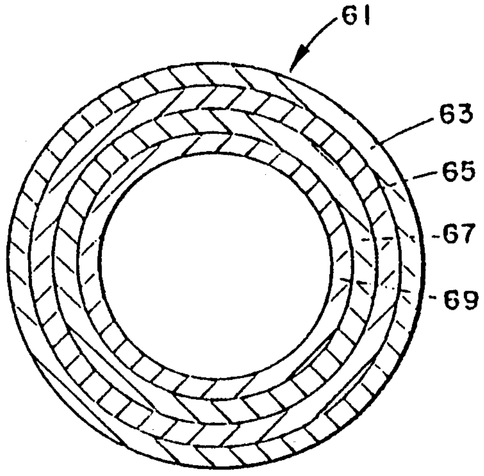
Figure 7:
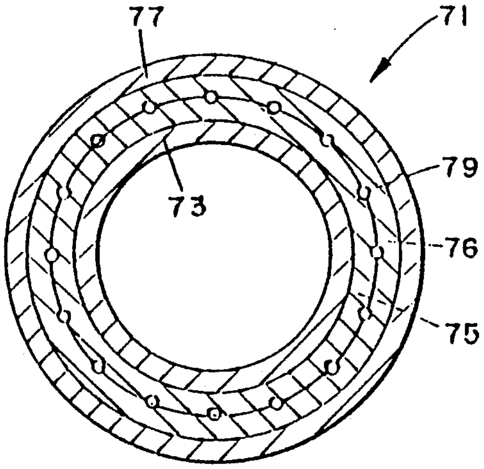
Figure 8:
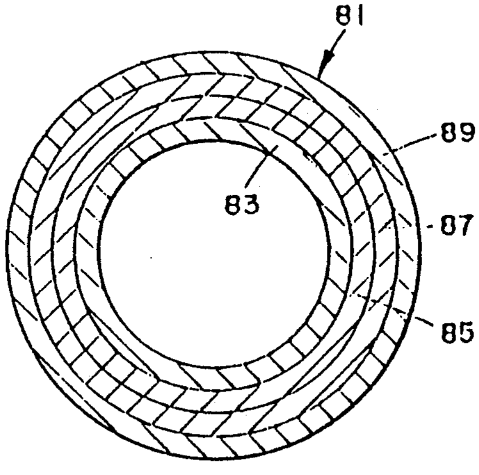

FIG. 5 shows a fuse tube 51 composed of scrim/mat having an outer layer 53 of scrim and an inner layer 55 of mat. FIG. 6 depicts a fuse tube 61 which, considering the layers in order from the outermost to the innermost layers, is composed of two juxtaposed layers of scrim/mat having layers, respectively, of mat 63 and scrim 65, and mat 67 and scrim 69. FIG. 7 shows a fuse tube 71 also having two juxtaposed layers of scrim/mat composed respectively of an inner layer 73 of scrim and intermediate layers 75 of mat, and an intermediate layer 76 of mat and an outer layer 77 of scrim. Layers 75 and 76 sandwich between them a layer of rovings 79. In FIG. 8, a fuse tube 81 is illustrated also having juxtaposed layers of scrin/mat, having respectively an inner layer 83 of mat, an intermediate layer 85 of scrim, and an intermediate layer 87 of scrim and an outer layer 89 of mat. Individual layers of scrim and mat, additional layers of rovings might in some instances be appropriate. Also, a liner of fabric might for some applications be appropriate.

The components of the foregoing products are available commercially. A satisfactory scrim is style No. 1659 of the Clark-Schwebel Fiber Glass Corp. This scrim has a warp yarn of 150-1/0, a filling yarn of 75-1/0, a county of 20×10 Leno weave, a weight of 1.60 oz./sq.yd., a thickness of 0.0042 inches and a breaking strength of 65×70 pounds/inch.

Fuse tubes made according to the invention have been found to have outstanding properties. Burst strengths in the range of 1700–3400 psi were achieved, and the product was fifty percent (50%) lower in raw material cost than comparable products made with woven fabric. The wall thickness is less than that of other fuse tubes even though the burst strength is higher. Less water absorption and retention, and greater dimensional control and dimensional stability have been experienced.

The description above has been generally confined to glass fiber mat and glass fiber scrim. However, other fiber reinforcements can be used in addition to or in place of these glass fibers. These other fibers include inorganic fibers such as graphite, boron, and the like, and organic fibers such as aramids, polypropylene, polyethylene, and the like.

The invention has been described in detail with particular reference to the preferred embodiments, but it should be understood that variations and modifications within the spirit and scope of the invention may occur to those skilled in the art to which the invention pertains.

Having described the invention, the following is claimed:

1. A process for making a tubular member, said process comprising the following steps:

randomly laying a plurality of continuous glass fibers on a side of glass fiber scrim, said fiber scrim being pre-coated with a binder material which is cured to maintain the dimensional relationships of the scrim fibers;

applying a liquid bath having particulate resinous material dispersed therein to said continuous glass fibers and the scrim;

compacting the glass fibers on the glass scrim;

curing the particulate resinous material collected between engaging surfaces of the continuous glass fibers and the scrim to bind them together;

impregnating the scrim and glass fiber composite with a thermo-setting resin; and pultruding the bound glass fibers and scrim to form the tubular member.

2. A process for making a fiber reinforced composite product, said process comprising the following steps:

laying a plurality of continuous glass fibers on a side of glass fiber scrim, said fiber scrim being pre-coated with a binder material which is cured to maintain the dimensional relationship of the scrim fibers;

applying a liquid bath having particulate resinous material dispersed therein to the continuous glass fibers and the glass scrim;

compacting the glass fibers on the glass scrim;

curing the particulate resinous material entrapped between engaging surfaces of the glass fibers and the glass scrim to bind them together;

impregnating the scrim and glass fiber composite with a thermosetting resin; and pultruding the bound glass fibers and glass scrim to form the composite product.

3. A method of forming pultrusions from generally flat mats of randomly oriented fiber comprising the steps of:

(a) coating a fiber scrim with a binder material and curing said binder material to maintain the dimensional relationship of said scrim;

(b) binding a plurality of randomly oriented continuous glass fibers to one side of said scrim with particles of resin to form a scrim/mat composite of increased tensile strength by applying a liquid bath having particulate resinous material dispersed therein to the continuous glass fibers and the glass scrim, compacting the glass fibers on the glass scrim and curing the particulate resinous material collected between the engaging surfaces of the continuous glass fibers and the glass scrim to effect a resinous bond;

(c) impregnating said scrim/mat composite with a thermosetting resin;

(d) pulling said resin-impregnated scrim/mat through a forming die to produce a pultrusion of predetermined cross-section; and (e) heating said pultrusion to cure said impregnating resin.

4. A method as defined in claim 3 wherein said glass mat weighs between $\frac{3}{4}$ and 1 oz. per $ft^2$.

* * * * *